United States Patent
Yanagisawa et al.

(10) Patent No.: US 11,209,406 B2
(45) Date of Patent: Dec. 28, 2021

(54) DATA PROCESSING DEVICE

(71) Applicant: Shimadzu Corporation, Kyoto (JP)

(72) Inventors: Toshinobu Yanagisawa, Kyoto (JP); Kanta Horie, Ibaraki (JP)

(73) Assignee: Shimadzu Corporation, Kyoto (JP)

( * ) Notice: Subject to any disclaimer, the term of this patent is extended or adjusted under 35 U.S.C. 154(b) by 321 days.

(21) Appl. No.: 16/098,213

(22) PCT Filed: Apr. 27, 2017

(86) PCT No.: PCT/JP2017/016736
§ 371 (c)(1),
(2) Date: Nov. 1, 2018

(87) PCT Pub. No.: WO2017/191803
PCT Pub. Date: Nov. 9, 2017

(65) Prior Publication Data
US 2019/0162708 A1 May 30, 2019

(30) Foreign Application Priority Data
May 2, 2016 (JP) .............................. JP2016-092591

(51) Int. Cl.
*G01N 30/86* (2006.01)
*G01N 30/72* (2006.01)
(Continued)

(52) U.S. Cl.
CPC ......... *G01N 30/8679* (2013.01); *G01N 30/72* (2013.01); *G01N 30/86* (2013.01);
(Continued)

(58) Field of Classification Search
CPC .... G01N 30/8679; G01N 30/72; G01N 30/86; G01N 30/8631; G01N 30/74;
(Continued)

(56) References Cited

U.S. PATENT DOCUMENTS

| 5,596,135 A | 1/1997 | Mito et al. |
| 2014/0257712 A1 | 9/2014 | Mito et al. |

(Continued)

FOREIGN PATENT DOCUMENTS

| CN | 105400712 A | 3/2016 |
| JP | S61-111425 A | 5/1986 |

(Continued)

OTHER PUBLICATIONS

Chinese Office Action dated Feb. 26, 2020, in connection with corresponding CN Application No. 201780026854.9 (17 pgs., including machine-generated English translation).

(Continued)

*Primary Examiner* — Daniel R Miller
*Assistant Examiner* — Christian T Bryant
(74) *Attorney, Agent, or Firm* — Maier & Maier, PLLC

(57) ABSTRACT

A data processing device that processes three-dimensional data having time, intensity, and wavelength collected from a sample serving as a measurement target includes: a chromatogram generator configured to generate a chromatogram from the three-dimensional data; a target peak determiner configured to determine a target peak from peaks appearing on the chromatogram; a time point specifier configured to specify a time point at which the size of a spectrum matches the size of a reference spectrum from a time range during which the target peak appears in the three-dimensional data; and a target spectrum generator configured to extract data at the time point from the three-dimensional data, thereby generating a spectrum at the time point. With this configuration, a spectrum that is not affected by distortion, saturation, or noise can be readily and reliably obtained from the three-dimensional data obtained through sample analysis.

10 Claims, 3 Drawing Sheets

(51) Int. Cl.
*G01N 30/74* (2006.01)
*H01M 10/48* (2006.01)
*H01M 10/42* (2006.01)
*B60L 50/60* (2019.01)

(52) U.S. Cl.
CPC .......... *G01N 30/8631* (2013.01); *B60L 50/60* (2019.02); *G01N 30/74* (2013.01); *H01M 10/425* (2013.01); *H01M 10/482* (2013.01); *Y02E 60/10* (2013.01); *Y02T 10/70* (2013.01)

(58) Field of Classification Search
CPC .. H01M 2/206; H01M 10/425; H01M 10/482; B60L 50/60; Y02E 60/10; Y02T 10/70
See application file for complete search history.

(56) References Cited

U.S. PATENT DOCUMENTS

| | | | | |
|---|---|---|---|---|
| 2014/0303904 A1* | 10/2014 | Kihara | ............... | G01N 30/8679 702/23 |
| 2016/0169848 A1* | 6/2016 | Kamata | ............... | G01N 30/8634 702/32 |
| 2016/0169849 A1* | 6/2016 | Kamata | ............... | G01N 30/8651 702/23 |
| 2017/0067865 A1 | 3/2017 | Shimomura et al. | | |

FOREIGN PATENT DOCUMENTS

| | | | |
|---|---|---|---|
| JP | H07-218491 A | | 8/1995 |
| JP | 2011-153966 A | | 8/2011 |
| JP | 2011153966 A | * | 8/2011 |
| JP | 5458913 B2 | | 4/2014 |
| WO | 2013/035639 A1 | | 3/2013 |
| WO | 2015/132861 A1 | | 9/2015 |

OTHER PUBLICATIONS

International Search Report with English translation and Written Opinion dated Aug. 1, 2017 of corresponding application No. PCT/JP2017/016736; 9 pgs.

English translation of Written Opinion dated Aug. 1, 2017 of corresponding application No. PCT/JP2017/016736; 5 pgs.

International Preliminary Report on Patentability dated Nov. 6, 2018 of corresponding application No. PCT/JP2017/016736; 6 pgs.

* cited by examiner

FIG.4
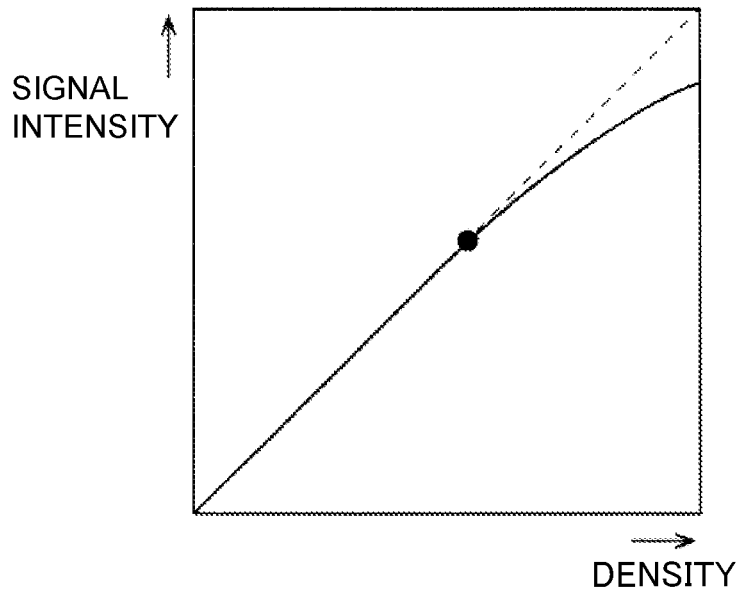
FIG. 5(a)
THREE-DIMENSIONAL DATA
FIG. 5(b)
CHROMATOGRAM
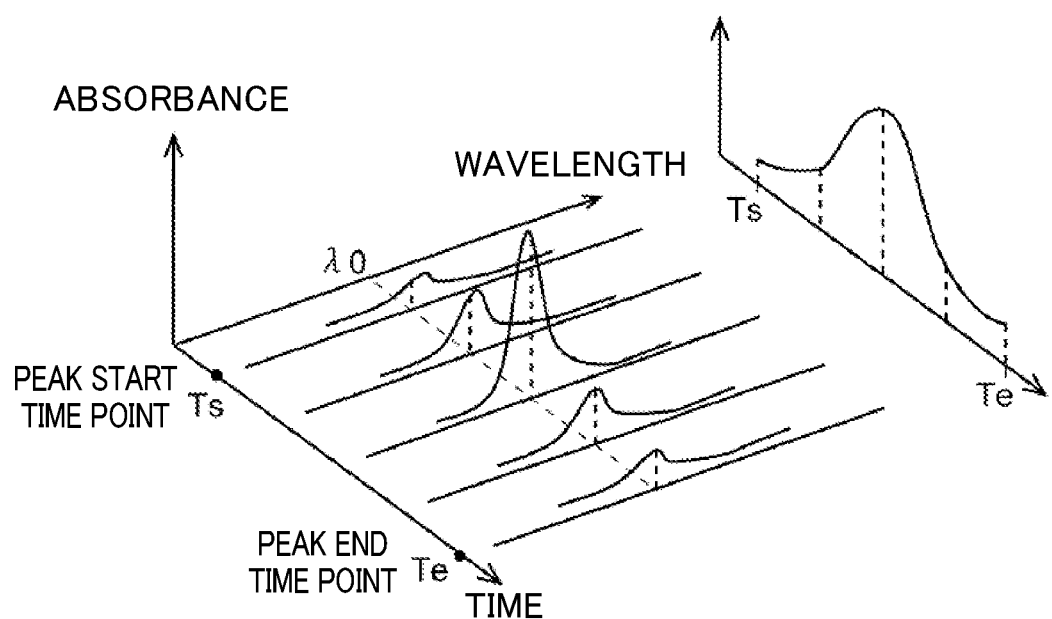

DATA PROCESSING DEVICE

FIELD

The present invention relates to a data processing device configured to process data obtained through analysis of a sample by use of an analysis device. More specifically, the present invention relates to a data processing device configured to process three-dimensional data having time, intensity, and an additional third dimension, such as wavelength or m/z, collected by an analysis device, examples of which include a liquid chromatograph (LC), a gas chromatograph (GC), or other types of chromatographs including a photodiode array detector (PDA detector) serving as a detector, and a chromatograph mass spectrometric device including such a chromatograph in combination with a mass spectrometric device.

BACKGROUND

A liquid chromatograph including a multi-channel photodetector, such as a PDA detector, repeatedly acquires the absorption spectrum of a sample liquid eluted from the outlet of a column, starting from an injection point of the sample into a mobile phase, thereby obtaining three-dimensional data having three dimensions of time (retention time), wavelength, and intensity (e.g., sample component absorbance, fluorescence intensity, emission intensity). In a liquid chromatograph and a gas chromatograph including a mass spectrometer serving as a detector, which are respectively referred to as a liquid chromatograph mass spectrometer and a gas chromatograph mass spectrometer, the mass spectrometer repeatedly performs scan measurement in a predetermined mass-to-charge ratio range, whereby three-dimensional data having three dimensions of time (retention time), mass-to-charge ratio (m/z), and intensity (e.g., ion intensity, output voltage) can be obtained.

In the following description, a liquid chromatograph including a PDA detector serving as an analysis device capable of obtaining three-dimensional data (hereinafter, a liquid chromatograph including a PDA detector will be simply referred to as "liquid chromatograph" unless otherwise specified) will be described as an example, but the same applies to a liquid chromatograph mass spectrometer, a gas chromatograph mass spectrometer, and the like.

FIG. 5(a) is a conceptual diagram of the three-dimensional data obtained by the above-described liquid chromatograph. From the three-dimensional data, absorbance data in a time direction at a specific wavelength (for example, $\lambda 0$) is extracted, so that the wavelength chromatogram (will be hereinafter simply referred to as "chromatogram") as illustrated in FIG. 5(b) showing the relation between the measurement time (i.e., retention time) and absorbance at the specific wavelength $\lambda 0$ can be generated. In addition, data indicating absorbance in a wavelength direction at a specific measurement time point (measurement time point) is extracted from the three-dimensional data, so that a wavelength spectrum (will be hereinafter simply referred to as "spectrum") showing the relation between the wavelength and absorbance at the time point can be generated. This means that the three-dimensional data as illustrated in FIG. 5(a) has spectrum information in the wavelength direction and chromatogram information in the time direction.

The data obtained by analyzing a sample with such a liquid chromatograph is delivered to a data processing device including a personal computer. This data processing device detects a peak appearing on the three-dimensional data and identifies a component corresponding to the peak with reference to an identification library prepared in advance, for example.

More specifically, intensity (absorbance) data in the time direction at a predetermined wavelength is extracted from the three-dimensional data to generate a chromatogram, and a peak appearing on the chromatogram is detected. In this process, the predetermined wavelength includes a single wavelength (for example, 254 nm), a plurality of wavelengths, or a wavelength range (for example, 254±50 nm) specified by the user in advance. When the predetermined wavelength includes a plurality of wavelengths or a wavelength range, for example, a chromatogram is generated by plotting average values of intensity (absorbance) in the plurality of wavelengths or the wavelength range at each retention time. Alternatively, a chromatogram obtained by plotting the maximum intensity (absorbance) at each retention time in the predetermined wavelength range may be generated (this type of chromatogram is generally referred to as "max plot").

Subsequently, a peak in the chromatogram is detected, a time point (retention time) at its peak top is specified, and intensity (absorbance) data in the wavelength direction at the time point is extracted from the three-dimensional data, whereby a wavelength spectrum (this wavelength spectrum is hereinafter referred to as "target spectrum") is generated. The target spectrum is compared with wavelength spectra of a large number of known materials recorded in the identification library. A known material corresponding to a spectrum having high similarity to the target spectrum in the identification library is extracted as a candidate component corresponding to the peak (the processing described above will be hereinafter referred to as "library search").

In addition to the above-described library search, the data processing device may perform a process for confirming whether a predetermined peak on the three-dimensional data belongs to a component predicted in advance (predicted component) (this processing will be hereinafter referred to as "spectrum identification"). This spectrum identification, as in the above-described library search, starts with generation of a chromatogram from the three-dimensional data, followed by extraction of data at a time point corresponding to a predetermined peak in the chromatogram to generate a target spectrum. This target spectrum is compared with a spectrum for the predicted component prepared in advance, whereby whether the peak belongs to the predicted component is determined.

Unfortunately, if the density of a component in the sample is excessively high in the sample analysis employing the liquid chromatograph, detection signals from the PDA detector may be saturated, and distortion or saturation may take place at the peak in the three-dimensional data. If this happens, the peaks in the chromatogram and the spectrum generated from the three-dimensional data inevitably involve distortion or saturation, which may lead to incorrect results in the library search and spectrum identification described above.

Conventional solutions to address the distortion or saturation at the peak in question in the chromatogram generated from the three-dimensional data include: reanalysis of the sample after being diluted; and resetting of where to extract a spectrum to a time point off the peak manually specified by the user.

PATENT DOCUMENT 1: Japanese Unexamined Patent Publication No. S61-111425
PATENT DOCUMENT 2: WO 2013/035639
PATENT DOCUMENT 3: Japanese Unexamined Patent Publication No. H07-218491

SUMMARY

In the above-described approach involving dilution of the sample, if the sample contains a plurality of target components with a large difference in density among the target components, regardless of how well the sample is diluted, the component having the smallest density cannot be correctly detected without distortion or saturation taking place in the signal originating from the component having the largest density, whereas the component (main component) having the largest density cannot be correctly detected without noise masking the component (impurity) of the smallest density, resulting in failure in analysis in any case. To address this drawback, the analysis is performed on multiple samples having different dilution rates. This method is, however, ineffective as it requires a long period of time for measurement.

In the approach involving the user's manual specification of where to extract a spectrum, the position too close to the peak top will result in influence of saturation of detector signals, whereas the position too far from the peak top will result in influence of noise because of insufficient signal intensity. Consequently, results of the library search and spectrum identification can depend on the degree of proficiency of the user.

While the GC or LC including the PDA detector serving as a detector is used in this example, the aforementioned is a problem common to configurations for processing data obtained by a GC or LC including a mass spectrometric device serving as a detector (i.e., a GC-MS or LC-MS), a capillary electrophoresis device including a PDA detector serving as a detector, and any other analysis device capable of acquiring three-dimensional data having time, intensity, and an additional third dimension (e.g., wavelength, m/z).

The present invention has been made in view of the foregoing, and an object thereof is to provide a data processing device that can readily and reliably obtain a spectrum that is not affected by distortion, saturation, or noise in generating a spectrum (for example, a wavelength spectrum or a mass spectrum) with intensity and a third dimension plotted on the axes from three-dimensional data having time, the intensity, and the third dimension.

A data processing device according to the present invention for solving the above-described problem is a data processing device that processes three-dimensional data having time, intensity, and a third dimension collected from a sample serving as a measurement target, the data processing device including:

a) an intensity-time graph generator configured to generate an intensity-time graph with the intensity and the time plotted on axes from the three-dimensional data;

b) a target peak determiner configured to determine a predetermined peak from peaks appearing on the intensity-time graph to be a target peak;

c) a time point specifier configured to specify a time point at which a size of a spectrum with the intensity and the third dimension plotted on axes matches a predetermined value from a time range during which the target peak appears in the three-dimensional data; and d) a target spectrum generator configured to extract data at the time point from the three-dimensional data and generate a target spectrum with the intensity and the third dimension at the time point plotted on axes.

In the present invention, the analysis device configured to acquire three-dimensional data to be processed is not limited to an LC or GC including a multi-channel detector, such as the above-described PDA detector, and may be an LC or GC including an ultraviolet visible spectrophotometer, an infrared spectrophotometer, a near-infrared spectrophotometer, or a fluorescence spectrophotometer capable of high-speed wavelength scanning (hereinafter collectively referred to as spectrophotometer) serving as a detector. The analysis device may be an LC or GC including a mass spectrometer serving as a detector (i.e., an LC-MS or GC-MS). The analysis device configured to acquire the three-dimensional data may be a device configured to detect a sample, not obtained through analysis using a column, but introduced using the flow injection analysis (FIA) method with a multi-channel photodetector or a spectrophotometer capable of high-speed wavelength scanning, and may be a capillary electrophoresis device including a multi-channel detector or a spectrophotometer capable of high-speed wavelength scanning serving as a detector.

The graph generated by the intensity-time graph generator (typically a chromatogram) may be a graph indicating variation with time of the sum of signal intensity in the entire range of the third dimension included in the three-dimensional data, or may be a max plot, i.e., a graph indicating variation with time of the average of signal intensity at a pre-specified value of the third dimension (for example, a wavelength) or in a range (for example, a wavelength range).

The target peak determiner may automatically determine a peak that satisfies a predetermined condition (for example, a peak with maximum intensity) from peaks appearing on the intensity-time graph to be a target peak. Alternatively, the target peak determiner may be configured to display the intensity-time graph on a screen of a monitor so that the user can select a desired peak on the graph.

As used in the present invention, the "size of the spectrum" means a representative value of intensities in a spectrum (for example, a wavelength spectrum or a mass spectrum). In this context, the representative value of the intensities can refer to, for example, a maximum value of the signal intensities in a predetermined range (for example, a predetermined wavelength range or m/z range) plotted on the horizontal axis of the spectrum, the area value of the spectrum in the predetermined range, or the square root of the inner product of the spectrum.

With the data processing device including the above-described configuration according to the present invention, a time point at which the size of the spectrum matches a predetermined value is searched for in the three-dimensional data, and the spectrum at the time point is extracted from the three-dimensional data automatically, in other words, without requiring the user's input or other operation involving a burdensome decision, to generate a target spectrum. In this process, the "predetermined value" is set to an appropriate value, so that a target spectrum that is not affected by distortion, saturation, or noise can be readily and reliably obtained.

The "predetermined value" is a single numeric value, a plurality of numeric values, or a numeric value range and is, for example, set by the user in advance. If there are a plurality of time points at which the size of the spectrum matches the predetermined value in the three-dimensional data, preferably, the user is allowed to select any one of the time points to be used for generation of the target spectrum, or the device automatically selects one point that satisfies a preset condition to be used for generation of the target spectrum.

In the above-described library search, spectrum identification, and the like, the size of a reference spectrum for comparison with the target spectrum may be obtained in advance, such that the size of the reference spectrum can serve as the "predetermined value."

In other words, the data processing device according to the present invention may further include e) a size specifier configured to specify a size of a reference spectrum that is a spectrum with the intensity and the third dimension plotted on axes, the spectrum being acquired in advance for a known material, and the time point specifier uses the size of the reference spectrum as the predetermined value.

The "size of the reference spectrum" means a representative value of intensities in the reference spectrum (for example, a wavelength spectrum or a mass spectrum). In this context, the representative value of the intensities can refer to the same type of the representative value indicating the "size of the spectrum" with the time point specifier.

In this manner, the "size" of the target spectrum can match the "size" of the reference spectrum, which facilitates acquisition of correct search results and identification results in the above-described library search, spectrum identification, and the like.

The target peak deriving from a single component causes no problem, but the peak does not necessarily derive from a single component. In many cases, a signal deriving from a single component is overlapped with another signal deriving from other components or impurities (that the analyzer does not expect) in the sample, or from unexpected drift or noise (factors other than the single component in a wide sense). If these factors are not taken into consideration, generation of the above-described target spectrum and the spectrum identification or library search employing the target spectrum can fail to achieve correct results. To address this, the data processing device according to the present invention preferably determines whether the time range during which the target peak appears in the three-dimensional data includes an overlap with a signal deriving from any factor other than the single component as described above, performs what is called peak purity determination, and if the target peak is overlapped with another peak deriving from any other factor than the single component, extracts data from a time range excluding the time point that includes the overlap in the three-dimensional data to generate the target spectrum.

In other words, the data processing device according to the present invention preferably further includes f) a peak purity determiner configured to determine whether a signal deriving from a single component in the sample is overlapped with a signal deriving from another factor at each time point in the time range during which the target peak appears in the three-dimensional data, and the time point specifier preferably specifies, in the three-dimensional data, a time point other than a time point that is determined to include an overlap with a signal deriving from the other factor in the time range during which the target peak appears, at which time point the size of the spectrum matches the predetermined value or approximates most to the predetermined value.

With this configuration, the target spectrum is generated by extracting data from a time point other than the time range that includes an overlap with the signal deriving from any factor other than the single component in the three-dimensional data. Therefore, even in a case where the target peak is likely to be affected by impurities, unexpected drift, or noise, a target spectrum not affected by these can be obtained.

The data processing device according to the present invention may further include g) a peak separator configured to separate the three-dimensional data collected from the sample serving as the measurement target into pieces of three-dimensional data on individual components in the sample, and among the three-dimensional data on the individual components, one piece of three-dimensional data corresponding to a predetermined component, or three-dimensional data obtained by subtracting a piece of three-dimensional data corresponding to components other than the predetermined component from the three-dimensional data before separation performed by the peak separator may be used for processing performed by the intensity-time graph generator, the target peak determiner, the time point specifier, and the target spectrum generator.

With the configuration including the peak separator described above, even if multiple components in the sample are detected in a temporally overlapped manner, signals from the multiple components are separated and respective pieces of three-dimensional data on the individual components are generated. The target spectrum can be generated from one piece among the pieces of three-dimensional data, that is, the piece of three-dimensional data on the predetermined component. If the peak of the main component is temporally overlapped with the peaks of impurities in the sample, the detector causes saturation because the main component has a higher density. As a result, separation (deconvolution) of the three-dimensional data on the main component can be failed. In this case, preferably, the main component is regarded as the predetermined component, and a target spectrum is generated from data obtained by removing pieces of three-dimensional data on components other than the predetermined component among the individual pieces of three-dimensional data separated by the peak separator from the original three-dimensional data. With this configuration, a spectrum (target spectrum) on the main component can be extracted more correctly.

Advantages of the Invention

As described above, with the data processing device according to the present invention, a target spectrum that is not affected by distortion, saturation, or noise can be readily and reliably obtained from three-dimensional data.

BRIEF DESCRIPTION OF THE DRAWINGS

FIG. 4 is a graph illustrating the relation between sample density and signal intensity.

FIG. 5(*a*) is a conceptual diagram of three-dimensional data obtained by a liquid chromatograph.

FIG. 5(*b*) is a diagram illustrating an example of a wavelength chromatogram.

DETAILED DESCRIPTION

Figure 1:
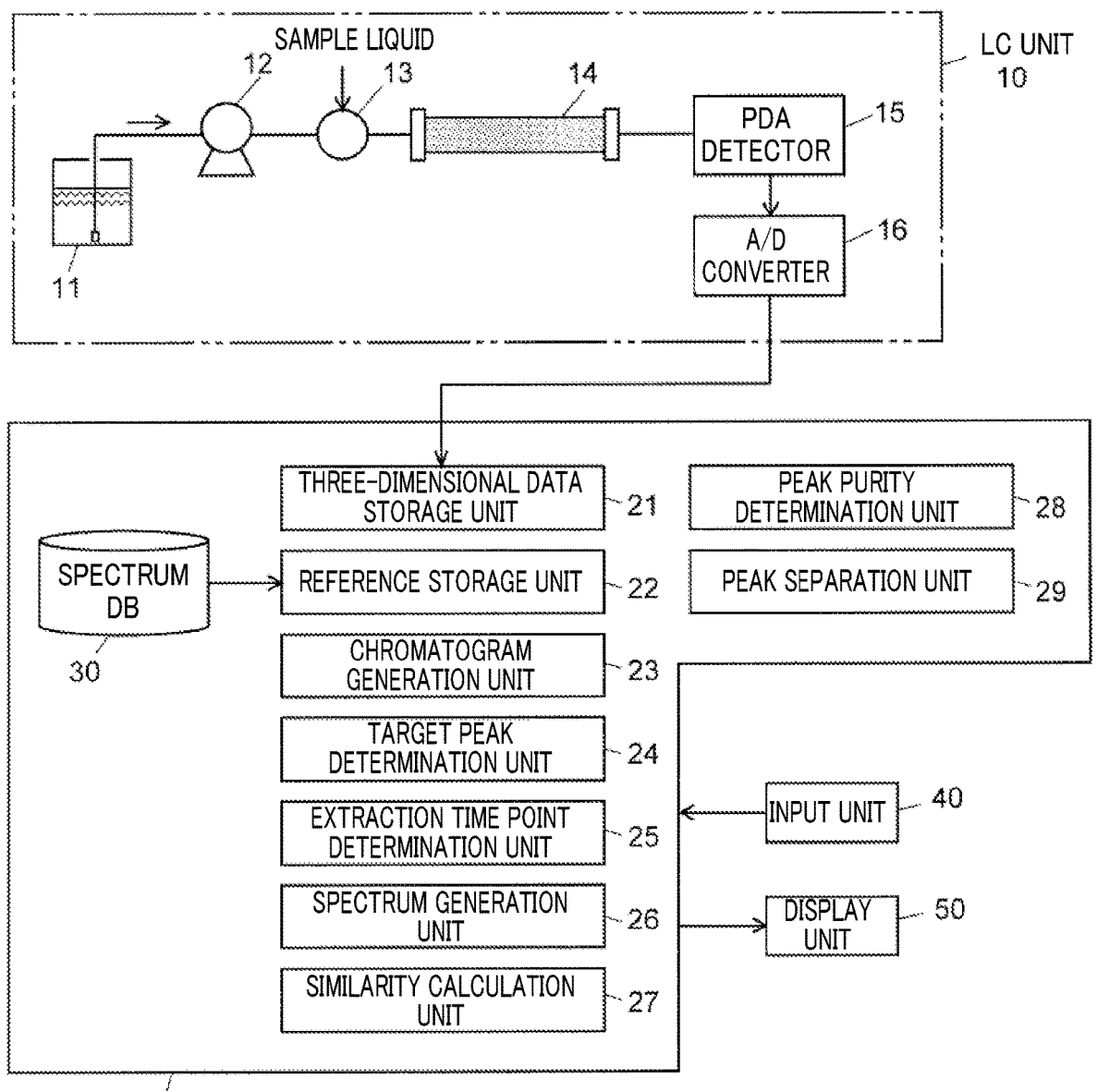
FIG. 1 is a schematic configuration diagram of an embodiment of a liquid chromatograph analysis system including a data processing device according to the present invention.

Embodiments of the present invention will be described below with reference to the accompanying drawings. FIG. 1 is a schematic configuration diagram of a liquid chromatograph analysis system (will be hereinafter referred to as "LC analysis system") including a data processing device according to an embodiment of the present invention.

This LC analysis system includes an LC unit 10 and a data processing unit 20 (corresponding to the data processing device according to the present invention). In the LC unit 10, a liquid feed pump 12 sucks a mobile phase from a mobile phase container 11 and feeds the mobile phase to an injector 13 at a constant flow rate. The injector 13 injects a sample liquid into the mobile phase at predetermined timing. The injected sample liquid is pressed by the mobile phase and introduced into a column 14. While passing through the column 14, components in the sample liquid are separated in a time direction and are eluted through the outlet of the column 14. The outlet of the column 14 is provided with a PDA detector 15 configured to repeatedly measure the absorbance distribution, in a predetermined wavelength range, of the eluted liquid introduced sequentially over time. The signals resulting from this measurement are converted into digital signals by an analog/digital (A/D) converter 16 and input as three-dimensional data to the data processing unit 20.

The data processing unit 20 is implemented in a general-purpose computer, such as a personal computer, dedicated hardware, or a combination of them. The data processing unit 20 includes functional blocks including a chromatogram generation unit 23 (corresponding to the intensity-time graph generator according to the present invention), a target peak determination unit 24 (corresponding to the target peak determiner according to the present invention), an extraction time point determination unit 25 (corresponding to the time point specifier according to the present invention), a spectrum generation unit 26 (corresponding to the target spectrum generator according to the present invention), a similarity calculation unit 27, a peak purity determination unit 28 (corresponding to the peak purity determiner according to the present invention), and a peak separation unit 29 (corresponding to the peak separator according to the present invention). These functional blocks are functional units basically implemented in software by a CPU in the computer, in which the data processing unit 20 is implemented, loading and executing a dedicated program installed in a storage unit including a mass storage device, such as a hard disk drive (HDD) or a solid state drive (SSD), in the memory of the computer. The dedicated program is not necessarily a single program. For example, the dedicated program may be a function embedded in part of the program for controlling the LC unit 10 and may take any desirable form. Furthermore, the data processing unit 20 includes a three-dimensional data storage unit 21 to store therein the three-dimensional data input from the data processing unit 20, a reference storage unit 22 to store therein a reference spectrum (described later), and a spectrum database (spectrum DB) 30. To the data processing unit 20, for example, an input unit 40 and a display unit 50 are connected. The input unit 40 allows an analyzer to specify various types of parameters required for data processing. The display unit 50 includes a liquid crystal display (LCD) to display analysis results, for example.

In the spectrum DB 30, data on various types of compounds, for example, compound name, molecular weight, compositional formula, structural formula, and absorption spectrum are registered. While the spectrum DB 30 stores in the data processing unit 20 in the present embodiment, this is not limiting, and the spectrum DB 30 may store in an external device connected via an interface (not illustrated) provided to the data processing unit 20. Alternatively, the spectrum DB 30 may be a database that stores in a server or the like on the Internet and can be accessed when the data processing unit 20 is linked to the Internet via the interface. The spectrum DB 30 may a database prepared in advance by the manufacturer of the LC or a database built by a user executing customized LC analysis.

In the LC analysis system according to the present embodiment, three-dimensional data collected by the LC unit 10 from one sample is temporarily stored in the three-dimensional data storage unit 21 as a single data file. The analyzer then specifies, with the input unit 40, a data file to be processed, and instructs start of spectrum identification, library search, or the like to execute a process for extracting a target spectrum from the three-dimensional data, which is a characteristic process in the present invention. Subsequently, similarity between the extracted target spectrum and a reference spectrum is calculated.

First, this paragraph describes an example of performing spectrum identification for confirming whether a peak appearing in the three-dimensional data belongs to a component predicted in advance (predicted component). In this spectrum identification, the user specifies the spectrum of the predicted component in advance and stores this spectrum as a reference spectrum used for calculating similarity in the reference storage unit 22. In this process, the user may select the reference spectrum related to the predicted component from a large number of spectra stored in the spectrum DB 30. Alternatively, a spectrum obtained in advance, for example, by measuring the predicted component with the LC unit 10, may be stored in the reference storage unit 22.

Figure 2:
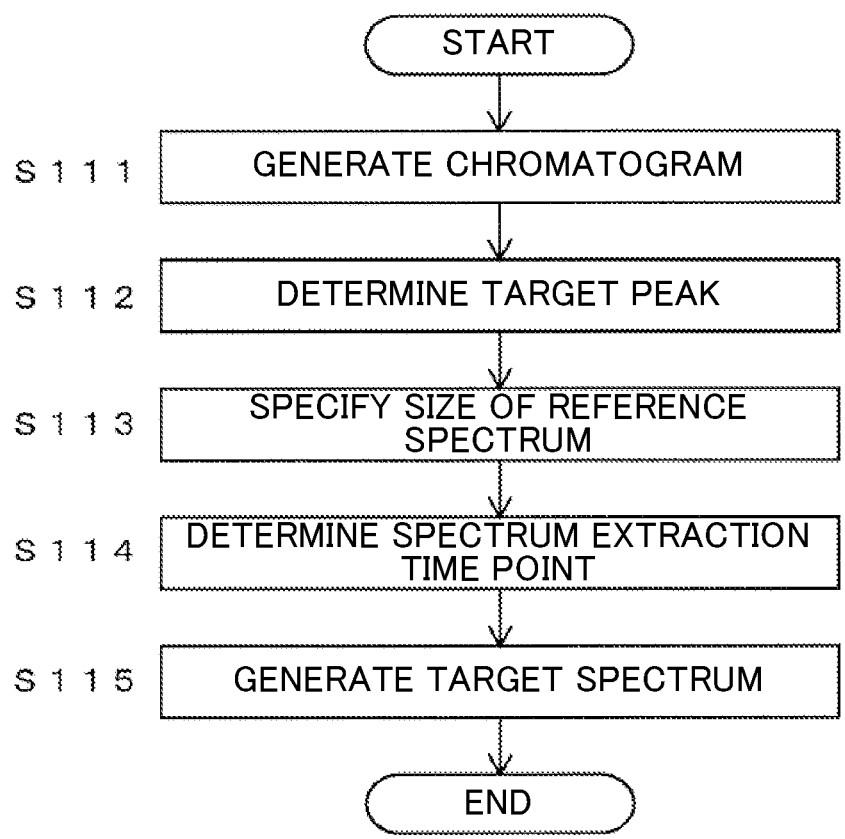
FIG. 2 is a flowchart illustrating an example process for generating a target spectrum from three-dimensional data performed by the data processing device.

Subsequently, the user instructs, with the input unit 40, start of spectrum identification. Then, background (for example, influence of the mobile phase in the LC unit 10) is removed from the three-dimensional data to be processed and the reference spectrum by use of a conventionally known method, and the process for extracting the target spectrum from the three-dimensional data is executed thereafter. The following describes the process for extracting the target spectrum with reference to the flowchart in FIG. 2.

First, the chromatogram generation unit 23 generates a chromatogram from the three-dimensional data from which the background has been removed (step S111). In this process, the types of the chromatogram generated may include, but not limited to, a plot of signal intensity at each retention time with respect to a wavelength specified in advance, or a plot of sum or average values of signal intensity at each retention time with respect to a plurality of wavelengths or a wavelength range specified in advance, for example. Alternatively, the types of the chromatogram may include a plot of maximum signal intensity (what is called a max plot) at each retention time with respect to the plurality of wavelengths or the wavelength range.

Subsequently, the target peak determination unit 24 selects a peak (target peak) to be a target of spectrum extraction from the peaks appearing on the chromatogram (step S112). The target peak determination unit 24 may automatically select a peak that satisfies a predetermined condition (for example, a peak with maximum intensity) from a plurality of peaks appearing on the chromatogram. An alternative configuration is such that the display unit 50 displays the chromatogram and the user is allowed to select a desired peak on the chromatogram with the input unit 40.

Subsequently, the extraction time point determination unit 25 refers to the reference spectrum (from which the background has been removed) stored in the reference storage unit 22 and specifies a maximum value of signal intensity in the predetermined wavelength range on the spectrum as the "size" of the reference spectrum (step S113). The predetermined wavelength range may be, for example, the entire measurement wavelength range supported by the PDA detector 15 or a wavelength range specified by the user in advance. While the maximum value of signal intensity in the predetermined wavelength range on the spectrum is defined as the "size" of the spectrum above, this is not limiting. For example, the area value of the spectrum waveform in a predetermined wavelength range or the square root of the inner product of a spectrum may be defined as the "size" of the spectrum.

Furthermore, the extraction time point determination unit 25 searches a time range (i.e., from the start time point to the end time point of the target peak) during which the target peak appears in the three-dimensional data for a time point at which the size of the spectrum matches the size of the reference spectrum and determines this time point to be a spectrum extraction time point (step S114). In general, there are a plurality of (typically, one each with a peak top time point interposed therebetween) time points at which the "size" of the spectrum matches the "size" of the reference spectrum in the time range during which the target peak appears. In this example, any one of the time points serves as the spectrum extraction time point. If the target peak has a small height and there is no time point at which the size of the spectrum matches the size of the reference spectrum in the time range of this peak, the user is notified of this fact to stop the process, or a time point at which the size of the spectrum approximates most to the size of the reference spectrum is searched for in the time range of the target peak and this time point is determined to be a spectrum extraction time point.

Upon determination of the spectrum extraction time point, the spectrum generation unit 26 extracts data indicating the distribution of signal intensity in a wavelength direction at the spectrum extraction time point from the three-dimensional data, thereby generating a spectrum showing the relation between the wavelength and signal intensity at the time point (step S115). This spectrum is hereinafter referred to as "target spectrum".

After the above-described process for extracting the target spectrum is completed, the similarity calculation unit 27 compares the target spectrum with the reference spectrum stored in the reference storage unit 22 and calculates similarity in patterns between these spectra. To calculate similarity in this process, for example, a method described in Patent Document 1 can be employed. More specifically, an n-th dimensional vector with a component that has an intensity Ki in n types of wavelengths a (k is an integer from 1 to n) in a spectrum is defined. An inner product of the n-th dimensional vector specified with the target spectrum and the n-th dimensional vector specified with the reference spectrum is divided by a product of the sizes of both vectors (i.e., a cosine of an angle θ formed by both vectors), and the quotient is defined as a spectrum similarity r (=cos θ). The spectrum similarity r is 1 if both spectra perfectly match each other. As the angle θ formed by the two vectors increases, in other words, as the difference in patterns between the two spectra increases, the similarity r (=cos θ) approaches zero.

The value of the similarity r of both spectra calculated by the similarity calculation unit 27 is displayed on the screen of the display unit 50. Referring to this display, the user can estimate whether the target peak derives from the predicted component.

In the above-described example, a spectrum extracted from any one of a plurality of time points at which the "size" of the spectrum matches the "size" of the reference spectrum in the three-dimensional data serves as the target spectrum. Alternatively, spectra each extracted from the plurality of time points may serve as target spectra. In this case, one of the plurality of (for example, two) target spectra is referred to as first target spectrum, and the other is referred to as second target spectrum. Then, a similarity r1 between the first target spectrum and the reference spectrum and a similarity r2 between the second target spectrum and the reference spectrum are calculated, and the average value of the similarity r1 and the similarity r2 is obtained as a final similarity r.

It will be described below how to estimate a component corresponding to the predetermined peak (target peak) on the three-dimensional data through library search by use of the data processing device according to the present embodiment. In this case, among spectra of known materials recorded in the spectrum DB 30, all the spectra or some of the spectra specified by the user in advance serve as search target spectra. Similarities between each of these search target spectra and the target spectrum extracted from the three-dimensional data are calculated. For example, known materials corresponding to spectra with high similarities are displayed on the display unit 50 as a candidate component corresponding to the target peak on the three-dimensional data.

In this process, search target spectra in the spectrum DB 30 are acquired one by one sequentially as reference spectra (i.e., stored in the reference storage unit 22). Then, the procedure illustrated in the flowchart in FIG. 2 may be performed, including specification of the sizes of the reference spectra (step S113), determination of extraction time points (step S114), and generation of a target spectrum (step S115), and similarity between the resultant target spectrum and the reference spectra may be calculated. This procedure, however, requires repetition of step S113 to S115 as many times as search target spectra, which may result in a long processing time. To address this, for example, before step S113 in FIG. 2, the relation between time and the sizes of spectra in a time range during which the target component is eluted (i.e., the time range during which the target peak appears) is obtained on the basis of the three-dimensional data and stored in the reference storage unit 22, and the sizes of the plurality of search target spectra (reference spectra) are specified in step S113. On the basis of the "relation between time and the sizes of spectra" stored in the reference storage unit 22, time points at which the size of the spectrum matches the size of each of the search target spectra is specified in the three-dimensional data, and the specified time points are determined to be spectrum extraction time points corresponding to the search target spectra (step S114). Subsequently, the spectra (target spectra) at the spectrum extraction time points are extracted from the three-dimensional data (step S115). Then, the similarity calculation unit 27 calculates similarities between each of the resulting target spectra and the search target spectra corresponding thereto (i.e., having the same size with the corresponding target spectrum).

In the data processing device according to the present invention, as described above, the spectrum extraction time points are determined from the three-dimensional data on the basis of the sizes of the reference spectra. Alternatively, a time point at which the size of a spectrum matches a value specified by the user in advance (referred to as the "index value" of spectrum extraction), for example, may be searched for in the three-dimensional data, so that the spectrum at the time point can be extracted as the target spectrum from the three-dimensional data.

Figure 3:
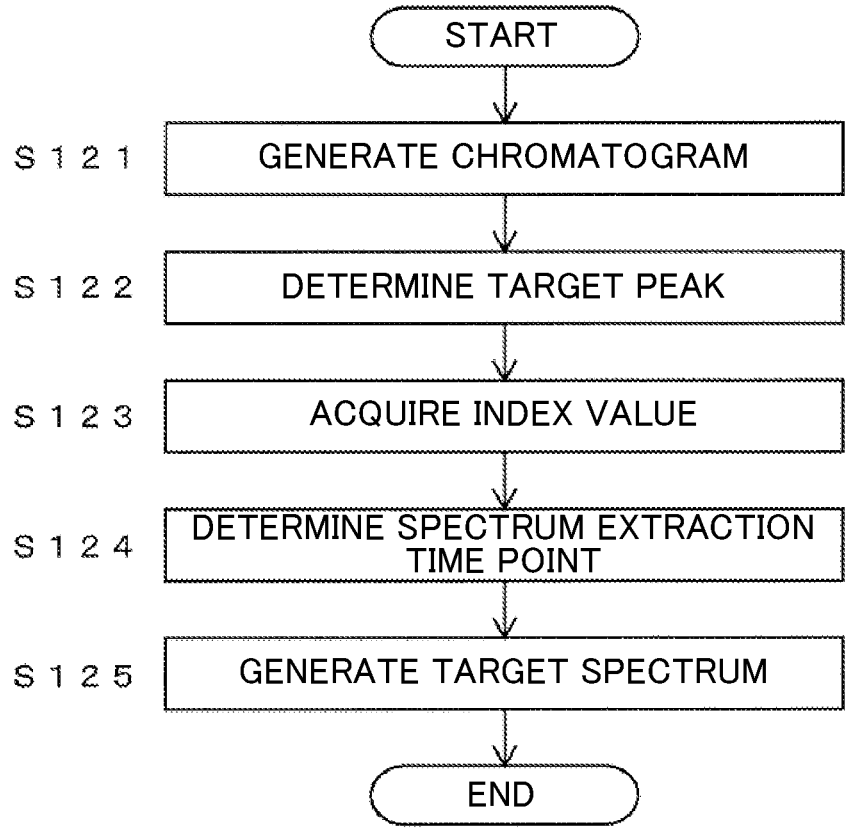
FIG. 3 is a flowchart illustrating another example process for generating a target spectrum from three-dimensional data performed by the data processing device.

Referring to the flowchart of FIG. 3, a process for generating target spectra in this case will be described below. First, in the same manner as described above, a chromatogram is generated from the three-dimensional data (step S121), and a target peak is determined from peaks on the chromatogram (step S122). Subsequently, the extraction time point determination unit 25 acquires the index value (step S123). This index value may be input by the user via the input unit 40 or may be stored in the memory (not illustrated) in the data processing unit 20 in advance and acquired for use. Upon acquiring the index value, the extraction time point determination unit 25 searches a time range during which the target peak appears in the three-dimensional data for a time point at which the size of the spectrum matches the index value and determines this time point to be a spectrum extraction time point (step S124). In this process as well, if there are a plurality of (typically two) time points at which the size of the spectrum matches the index value in the time range of the target peak, any one or all of the time points may serve as the time point(s) for extraction of the spectrum.

When the spectrum extraction time point is determined as described above, the spectrum generation unit 26 extracts data indicating the distribution of signal intensity in a wavelength direction at the spectrum extraction time point from the three-dimensional data, thereby generating a spectrum (target spectrum) showing the relation between the wavelength and signal intensity at the time point (step S125).

The "index value" used in the above-described spectrum extraction process can be determined in advance on the basis of the relation between the sample density and signal intensity. In other words, standard samples having various densities are measured with the PDA detector 15 in advance without separation through the column 14, the sum of signal intensity in the corresponding predetermined wavelength range (the same wavelength range as the above-described target spectrum) is obtained, and a graph plotting the relation between the sum of the signal intensity and sample density is generated. As a result, a graph as illustrated in FIG. 4 can be obtained. In this graph, a region with a low sample density exhibits a linear relation between the sample density and signal intensity, whereas a region with a relatively high sample density exhibits a non-linear relation. For example, by setting the signal intensity at the upper limit of the range (indicated by the black dot in FIG. 4) exhibiting linearity in this graph to be the index value, a target spectrum that is not affected by signal saturation or non-linearity can be obtained.

In the method described above, if multiple components (for example, a main component and a sub-component) are eluted in the time range of the target peak, the resulting target spectrum includes an overlap of the spectrum of the main component and the spectrum of the sub-component, which may lead to incorrect spectrum identification results or library search results. In addition to such multiple components in the sample, an overlap with peaks caused by solvent components, unexpected drift, or noise (due to bubbles in the solvent, malfunction of a column oven, or the like) (hereinafter collectively referred to as impurity peak) in the time range of the target peak may also lead to incorrect spectrum identification results or library search results. To address this, preferably, purity determination of a peak appearing on the three-dimensional data is performed in advance to specify a time range that may include an overlap with the impurity peak in the time range of the target peak, so that a target spectrum can be extracted at a time point out of the time range. In this case, if there is no time point corresponding to a successful match with the size of the reference spectrum or the index value in a range excluding the time range that may include an overlap with the impurity peak in the time range of the target peak, the time point at which the size of the spectrum approximates most to these values is determined to be the extraction time point.

The method for determining peak purity is not limited to any particular method, and conventionally known methods can be applied. For example, the differential spectrum chromatography described in Patent Document 2 can be employed. In the differential spectrum chromatography, the analyzer specifies the absorption wavelength of a target component. Then, differential values in the wavelength direction around the absorption wavelength on each of the spectra arranged in the time direction are calculated, and a differential chromatogram with the differential values arranged in the time direction is generated. If a peak appearing in the absorption wavelength on a spectrum is overlapped with another component, the differential chromatogram is not flat and has a peak. Accordingly, whether the differential chromatogram has any peak can be used to determine whether there is an overlap with other components. As the method for determining the peak purity, instead of the differential spectrum chromatography described above, a method described in Patent Document 3 may also be employed.

Instead of the above-described method for determining the time point for extraction of the target spectrum from the time range excluding the time range that may include an overlap with the impurity peak, peak separation processing may be performed in advance on the three-dimensional data to generate respective pieces of three-dimensional data on individual components in the sample, so that any one of the generated pieces of three-dimensional data (for example, the three-dimensional data selected by the user or the three-dimensional data having the maximum peak intensity) can be selected for the determination of the time point for extraction of the spectrum and the generation of the spectrum (target spectrum) at the time point. This process ensures a target spectrum only consisting of signals deriving from a single component to be obtained. Using such a target spectrum can lead to correct library search results and spectrum identification results. As the method for peak separation processing described above, a method involving peak deconvolution proposed in PCT/JP2014/073196 can be employed.

The data processing device according to the above-described embodiment is an example application of the present invention. It is obvious that any modification, addition, and change not departing from the scope of the present invention will fall within the scope of the appended claims.

For example, the analysis device configured to acquire the three-dimensional data to be processed in the present invention is not limited to an LC (or a GC) including a multi-channel detector, such as the PDA detector as described above, and may be an LC or a GC including an ultraviolet-visible spectrophotometer, an infrared spectrophotometer, a near-infrared spectrophotometer, and a fluorescence spectrophotometer capable of high-speed wavelength scanning.

The analysis device may be an LC-MS or a GC-MS including a mass spectrometer serving as a detector.

Examples of the three-dimensional data having three dimensions of time, intensity, and wavelength include not only data obtained through analysis using a column, but also data obtained by a PDA detector or the like to detect a sample introduced using the flow injection analysis (FIA) method and data obtained by capillary electrophoresis involving, as a detector, the above-described multi-channel detector or a spectrophotometer capable of high-speed wavelength scanning. These types of data are substantially the same as the three-dimensional data obtained by a liquid chromatograph.

The invention claimed is:

1. A data processing device that processes three-dimensional data having time, intensity, and a third dimension collected from a sample serving as a measurement target, the data processing device comprising:
   a) an intensity-time graph generator configured to generate an intensity-time graph with the intensity and the time plotted on axes from the three-dimensional data;
   b) a target peak determiner configured to determine any one peak from peaks appearing on the intensity-time graph to be a target peak;
   c) a time point specifier configured to specify a time point at which a size of a spectrum with the intensity and the third dimension plotted on axes matches a predetermined value from a time range from a start time point to an end time point of the target peak in the three-dimensional data;
   d) a target spectrum generator configured to extract data at the time point specified by the time point specifier from the three-dimensional data and generate a target spectrum with the intensity and the third dimension at the time point plotted on axes; and
   e) a size specifier configured to specify a size of a reference spectrum that is a spectrum with the intensity and the third dimension plotted on axes, the spectrum being acquired in advance for a known material, wherein the time point specifier uses the size of the reference spectrum as the predetermined value.

2. The data processing device of claim 1, wherein the third dimension is a wavelength, the intensity-time graph is a chromatogram, and the spectrum is a wavelength spectrum.

3. The data processing device of claim 1, wherein the third dimension is m/z, the intensity-time graph is a chromatogram, and the spectrum is a mass spectrum.

4. The data processing device of claim 1, further comprising:
   f) a peak purity determiner configured to determine whether a signal deriving from a single component in the sample is overlapped with a signal deriving from another factor at each time point in the time range during which the target peak appears in the three-dimensional data, wherein
   the time point specifier specifies, in the three-dimensional data, a time point other than a time point that is determined to include an overlap with a signal deriving from the other factor in the time range during which the target peak appears, at which time point the size of the spectrum matches the predetermined value or approximates most to the predetermined value.

5. The data processing device of claim 1, further comprising:
   g) a peak separator configured to separate the three-dimensional data collected from the sample serving as the measurement target into pieces of three-dimensional data on individual components in the sample, wherein
   among the three-dimensional data on the individual components, one piece of three-dimensional data corresponding to a predetermined component, or three-dimensional data obtained by subtracting a piece of three-dimensional data corresponding to components other than the predetermined component from the three-dimensional data before separation performed by the peak separator is used for processing performed by the intensity-time graph generator, the target peak determiner, the time point specifier, and the target spectrum generator.

6. The data processing device of claim 1, further comprising:
   a reference spectrum storage unit configured to store therein a reference spectrum used for similarity calculation; and
   a similarity calculation unit configured to compare the target spectrum generated by the target spectrum generator with the reference spectrum stored in the reference spectrum storage unit, thereby calculating similarity between the target spectrum and the reference spectrum.

7. The data processing device of claim 6, wherein the time point specifier specifies a plurality of time points at which the size of the spectrum matches a predetermined value,
   the target spectrum generator generates the target spectrum at each of the time points, and
   the similarity calculation unit calculates similarity between the target spectrum at each of the time points and the reference spectrum, and calculates an average value of resulting similarities.

8. The data processing device of claim 1, wherein the third dimension is plotted continuously in the reference spectrum.

9. A data processing method for processing three-dimensional data having time, intensity, and a third dimension collected from a sample serving as a measurement target, the data processing method comprising:
   a) generating an intensity-time graph with the intensity and the time plotted on axes from the three-dimensional data;
   b) determining any one peak from peaks appearing on the intensity-time graph to be a target peak;
   c) specifying a size of a reference spectrum that is a spectrum with the intensity and the third dimension plotted on axes, the spectrum being acquired in advance for a known material and
   d) specifying a time point at which a size of a spectrum with the intensity and the third dimension plotted on axes matches the size of the reference spectrum from a time range from a start time point to an end time point of the target peak in the three-dimensional data;
   e) extracting data at the specified time point from the three-dimensional data and generating a target spectrum with the intensity and the third dimension at the time point plotted on axes.

10. The data processing method of claim 9, wherein the three-dimensional data is collected by introducing a sample that is the measurement target into a column, and repeatedly performing measurement on an eluted liquid sequentially eluted from the column using a multi-channel photodetector or a spectrophotometer capable of wavelength scanning,
   the third dimension is a wavelength, and
   a plurality of standard samples having different densities are measured with the multi-channel photodetector or the spectrophotometer capable of wavelength scanning without separation through a column, a sum of signal intensity in the same wavelength range as the target spectrum is obtained, a graph plotting a relation between the sum of the signal intensity and the densities of the standard samples is generated, and the signal intensity at an upper limit of a range in which the graph exhibits linearity is set to be the predetermined value.

\* \* \* \* \*